US006892159B2

(12) United States Patent
Weiss et al.

(10) Patent No.: US 6,892,159 B2
(45) Date of Patent: May 10, 2005

(54) METHOD AND SYSTEM FOR STORING FIELD REPLACEABLE UNIT OPERATIONAL HISTORY INFORMATION

(75) Inventors: Steven E. Weiss, San Diego, CA (US); Raymond J. Gilstrap, Milpitas, CA (US); Emrys Williams, Milton Keynes (GB); David S. Gordon, Farnborough (GB); Gregory S. Jumper, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 11 days.

(21) Appl. No.: 10/412,852

(22) Filed: Apr. 14, 2003

(65) Prior Publication Data

US 2003/0216881 A1 Nov. 20, 2003

Related U.S. Application Data

(60) Provisional application No. 60/381,131, filed on May 17, 2002, provisional application No. 60/381,116, filed on May 17, 2002, and provisional application No. 60/381,400, filed on May 17, 2002.

(51) Int. Cl.⁷ ............................................... G06F 15/00

(52) U.S. Cl. ..................................... 702/130; 702/127

(58) Field of Search ................................ 702/127, 130, 702/180, 182, 183, 185, 186, 187, 189

(56) References Cited

U.S. PATENT DOCUMENTS

| | | | |
|---|---|---|---|
| 5,068,851 A | 11/1991 | Bruckert et al. |
| 5,253,184 A | 10/1993 | Kleinschnitz |
| 5,293,556 A | 3/1994 | Hill et al. |
| 5,404,503 A | 4/1995 | Hill et al. |
| 5,867,809 A | 2/1999 | Soga et al. |
| 6,154,728 A | 11/2000 | Sattar et al. |
| 6,349,268 B1 | 2/2002 | Ketonen et al. |

FOREIGN PATENT DOCUMENTS

| | | |
|---|---|---|
| EP | 623 900 | 11/1994 |
| WO | 03/014752 | 2/2003 |

OTHER PUBLICATIONS

Hewlett Packard, White Paper, "IPMI: Intelligent Platform Management Interface," Feb. 1998, 5 pages.
Intel, Hewlett–Packard, NEC, Dell, "–IPMI– Platrform Event Trap Format Specification," v1.0, Revision 1.0, Dec. 7, 1998, 17 pages.
Intel, Hewlett–Packard, NEC, Dell, "–IPMI– IPMB v1.0 Address Allocation," Revision 1.0, Sep. 16, 1998, 5 pages.
Intel, Hewlett–Packard, NEC, Dell, "–IPMI– Platrform Management FRU Information Storage Definition," v1.0, Revision 1.1, Sep. 27, 1999, 27 pages.
Atmel Corporation, "2–Wire Serial EEPROM," Rev. 03361–SEEPR–07/02, 19 pages.
Atmel Corporation, "Interfacing 24CXX Serial EEPROMs," Rev. 0507D–05/01, 3 pages.
Atmel Corporation, "Atmel's Serial EEPROMs, Solutions for all your design needs," Jan. 1999, 7 pages.
IDEAS International Pty., Ltd., "Sun–ft–SPARC," Competitive Profiles, Jan. 27, 1999, 2 pages.
Sun Microsystems, Inc., "Netra ft 1800 Module EEPROM v.4 Data File Specifications," 1998, 56 pages.

(Continued)

*Primary Examiner*—John Barlow
*Assistant Examiner*—Douglas N Washburn
(74) *Attorney, Agent, or Firm*—Lawrence J. Merkel; Meyertons, Hood, Kivlin, Kowert & Goetzel, P.C.

(57) ABSTRACT

A method for tracking repair histories includes providing a field replaceable unit having a memory device. Operational history data is collected during the operation of the field replaceable unit. The operational history data is stored in the memory device. A computing system includes a field replaceable unit including a memory device configured to store operational history data associated with the field replaceable unit.

53 Claims, 5 Drawing Sheets

OTHER PUBLICATIONS

Sun Microsystems, Inc., "Netra ft 1800 Module EEPROM v.4 Data File Specifications, Repair and Reference Fields," 1998, 32 pages.

Sun Microsystems, Inc., "Netra ft 1800 Module EEPROM v.4 Data File Specifications, RMM–Specific Data," 1998, 4 pages.

Sun Microsystems, Inc., "Netra ft 1800 Module EEPROM v.4 Data File Specifications, PCI Card–Specific Data," 1998, 4 pages.

Sun Microsystems, Inc., "Netra ft 1800 Module EEPROM v.4 Data File Specifications, Disk Chassis–Specific Data," 1998, 4 pages.

Sun Microsystems, Inc., "Netra ft 1800 Module EEPROM v.4 Data File Specifications, Motherboard–Specific Data," 1998, 6 pages.

Sun Microsystems, Inc., "Netra ft 1800 Module EEPROM v.4 Data File Specifications, CPUset–Specific Data," 1998, 9 pages.

Sun Microsystems, Inc., "Netra ft 1800 Module EEPROM v.4 Data File Specifications, Generic Data–All Modules," 1998, 20 pages.

"eeprom—display or alter information in a hardware module's eeprom," facsimile received on Jan. 31, 2003, printed on May 19, 1993, 2 pages.

METHOD AND SYSTEM FOR STORING FIELD REPLACEABLE UNIT OPERATIONAL HISTORY INFORMATION

This patent application claims benefit of priority to U.S. Provisional Patent Application Ser. No. 60/381,131, filed May 17, 2002. This patent application claims benefit of priority to U.S. Provisional Patent Application Ser. No. 60/381,116, filed May 17, 2002. This patent application claims benefit of priority to U.S. Provisional Patent Application Ser. No. 60/381,400, filed May 17, 2002. The above applications are incorporated herein by reference in their entireties.

BACKGROUND OF THE INVENTION

1. Field of the Invention

This invention relates generally to a processor-based computer system, and, more particularly, to a method and system for storing field replaceable unit operational history information.

2. Description of the Related Art

The last several years have witnessed an increased demand for network computing, partly due to the emergence of the Internet. Some of the notable trends in the industry include a boom in the growth of Applications Service Providers (ASPs) that provide applications to businesses over networks and enterprises that use the Internet to distribute product data to customers, take orders, and enhance communications with employees.

Businesses typically rely on network computing to maintain a competitive advantage over other businesses. As such, developers, when designing processor-based systems for use in network-centric environments, may take several factors into consideration to meet the expectation of the customers, factors such as the functionality, reliability, scalability, and performance of such systems.

One example of a processor-based system used in a network-centric environment is a mid-frame server system. Typically, mid-frame servers are employed in high bandwidth systems requiring high availability factors. Minimizing system downtime is an important system management goal, as downtime generally equates to significant lost revenue. Typically, such computer systems are provided with replaceable components or modules that may be removed and/or installed without shutting down the system. This on-line replacement capability is commonly referred to as a hot-pluggable or hot-swappable environment.

Unlike current desktop computer systems, in which the internal cards and devices are essentially disposable (i.e., they are replaced if they fail, and the defective part is discarded without repair), the individual components used to construct higher end systems, such as the mid-frame server described above, are typically returned to the manufacturer or a third-party vendor associated with the manufacturer for repair. Repaired units are then reinstalled in the same or in a different mid-frame server. Such repairable components are commonly referred to as field replaceable units (FRUs). In the service life of a particular FRU, it may be installed in multiple servers owned by different customers. Exemplary units that may be field replaceable are system control boards, processing boards, memory modules installed on one of the processing boards, input/output (I/O) boards, power supplies, cooling fans, and the like.

Throughout the service life of a particular FRU, it may be serviced by different repair entities and installed in different customer facilities. Because of the different entities involved during the service life of the FRU, it is difficult to maintain accurate and retrievable records for the individual FRUs. Different databases including information about the FRU may not be centralized or even available.

When a FRU is received for repair it may be difficult to trace its operational history. The operational history may affect the failure rate of the FRU. One operational history parameter affecting failure rates is temperature. Failure rates are often directly dependent on temperature. Various aging mechanisms in the FRU run at temperature controlled rates. Cooling systems are generally designed based on predicted failure rates to provide sufficient cooling to keep actual failure rates at an acceptable level. A FRU returned for repair may have experienced an age related failure in line with the expected failure rates. However, it may also be the case that the predicted temperature based failure model was incorrect and the cooling system design was inadequate to protect the FRU. Because the operational history is difficult to track, it is often correspondingly difficult to diagnose root causes for the FRU failures.

The present invention is directed to overcoming, or at least reducing the effects of, one or more of the problems set forth above.

SUMMARY OF THE INVENTION

One aspect of the present invention is seen in a method for tracking operational histories. The method includes providing a field replaceable unit having a memory device. Operational history data is collected during the operation of the field replaceable unit. The operational history data is stored in the memory device.

Another aspect of the present invention is seen in a computing system including a field replaceable unit including a memory device configured to store operational history data associated with the field replaceable unit.

BRIEF DESCRIPTION OF THE DRAWINGS

The invention may be understood by reference to the following description taken in conjunction with the accompanying drawings, in which like reference numerals identify like elements, and in which.

Figure 1:
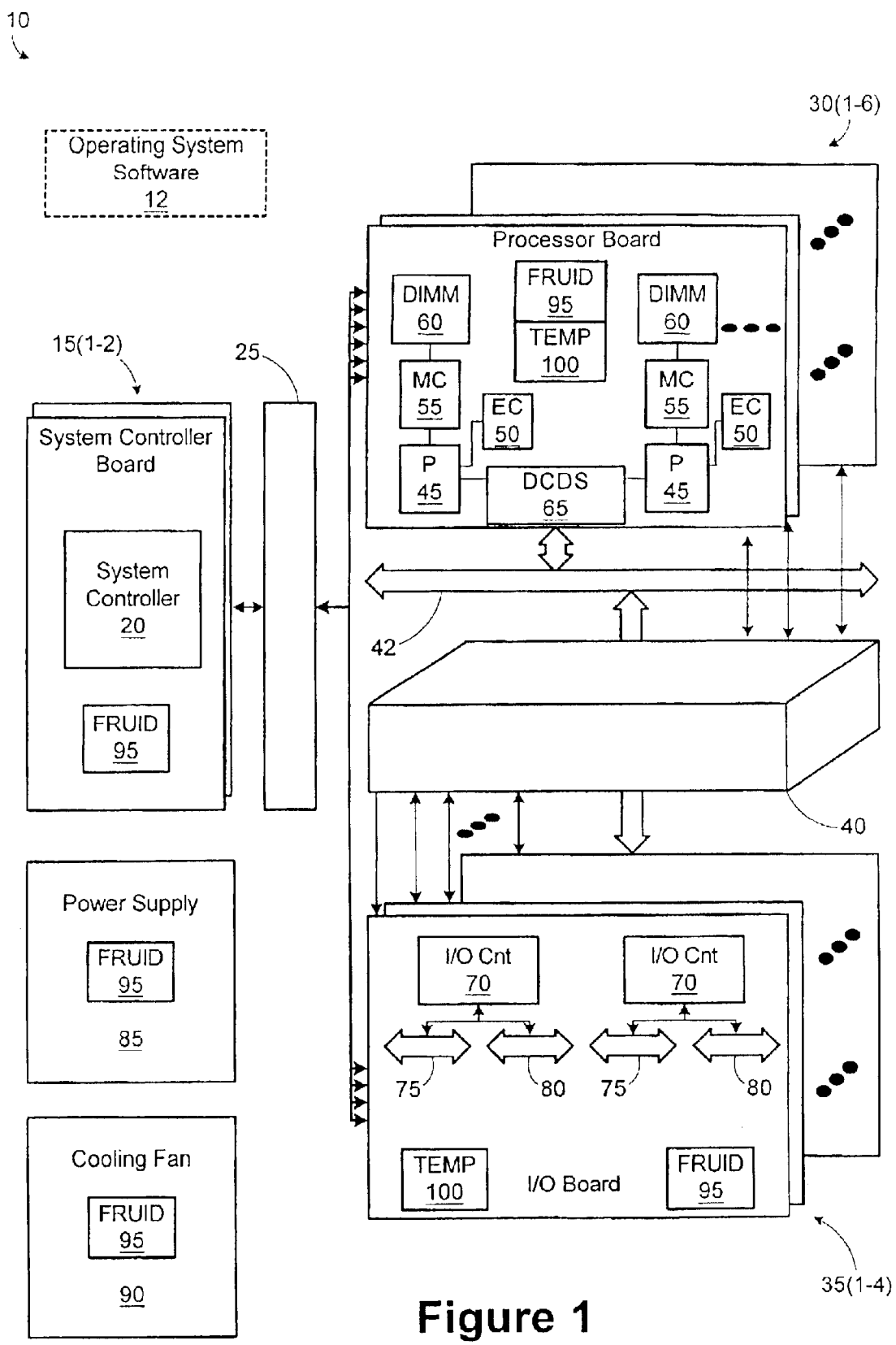
FIG. 1 is a simplified block diagram of a system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, and/or magnetic signals capable of being stored, transferred, combined, compared, and otherwise manipulated. It has proven convenient at times, principally for reasons of common usage, to refer to these signals as bits, values, elements, symbols, characters, terms, numbers, and the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" and the like, refer to the action and processes of a computer system, or similar electronic computing device, that manipulates and transforms data represented as physical, electronic quantities within the computer system's registers and/or memories into other data similarly represented as physical quantities within the computer system memories and/or registers and/or other such information storage, transmission and/or display devices.

The programming instructions necessary to implement these software functions may be resident on various storage devices. Such storage devices referred to in this discussion may include one or more machine-readable storage media for storing data and/or instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, and/or modules in the various systems may be stored in respective storage devices. The instructions, when executed by a respective control unit, cause the corresponding system to perform programmed acts as described.

Referring now to FIG. 1, a block diagram of a system 10 in accordance with one embodiment of the present invention is illustrated. In the illustrated embodiment, the system 10 is adapted to run under an operating system 12, such as the Solaris™ operating system offered by Sun Microsystems, Inc. of Palo Alto, Calif.

The system 10, in one embodiment, includes a plurality of system control boards 15(1–2), each including a system controller 20, coupled to a console bus interconnect 25. The system controller 20 may include its own microprocessor and memory resources. The system 10 also includes a plurality of processing boards 30(1–6) and input/output (I/O) boards 35(1–4). The processing boards 30(1–6) and I/O boards 35(1–4) are coupled to a data interconnect 40 and a shared address bus 42. The processing boards 30(1–6) and I/O boards 35(1–4) also interface with the console bus interconnect 25 to allow the system controller 20 access to the processing boards 30(1–6) and I/O boards 35(1–4) without having to rely on the integrity of the primary data interconnect 40 and the shared address bus 42. This alternative connection allows the system controller 20 to operate even when there is a fault preventing main operations from continuing.

In the illustrated embodiment, the system 10 is capable of supporting 6 processing boards 30(1–6) and 4 I/O boards 35(1–4). However, the invention is not limited to such an individual implementation, as any number of such resources may be provided. Also, the invention is not limited to the particular architecture of the system 10.

For illustrative purposes, lines are utilized to show various system interconnections, although it should be appreciated that, in other embodiments, the boards 15(1–2), 30(1–6), 35(1–4) may be coupled in any of a variety of ways, including by edge connectors, cables, and/or other available interfaces.

In the illustrated embodiment, the system 10 includes two control boards 15(1–2), one for managing the overall operation of the system 10 and the other for providing redundancy and automatic failover in the event that the other board 15(1–2) fails. Although not so limited, in the illustrated embodiment, the first system control board 15(1) serves as a "main" system control board, while the second system control board 15(2) serves as an alternate hot-swap replaceable system control board.

The main system control board 15(1) is generally responsible for providing system controller resources for the system 10. If failures of the hardware and/or software occur on the main system control board 15(1) or failures on any hardware control path from the main system control board 15(1) to other system devices occur, system controller failover software automatically triggers a failover to the alternative control board 15(2). The alternative system control board 15(2) assumes the role of the main system control board 15(1) and takes over the main system controller responsibilities. To accomplish the transition from the main system control board 15(1) to the alternative system control board 15(2), it may be desirable to replicate the system controller data, configuration, and/or log files on both of the system control boards 15(1–2). During any given moment, generally one of the two system control boards 15(1–2) actively controls the overall operations of the system 10. Accordingly, the term "active system control board," as utilized hereinafter, may refer to either one of the system control boards 15(1–2), depending on the board that is managing the operations of the system 10 at that moment.

For ease of illustration, the data interconnect 40 is illustrated as a simple bus-like interconnect. However, in an actual implementation the data interconnect 40 is a point-to-point switched interconnect with two levels of repeaters or switches. The first level of repeaters is on the various boards 30(1–6) and 35(1–4), and the second level of repeaters is resident on a centerplane (not shown). The data interconnect 40 is capable of such complex functions as dividing the system into completely isolated partitions and dividing the system into logically isolated domains, allowing hot-plug and unplug of individual boards.

In the illustrated embodiment, each processing board 30(1–6) may include up to four processors 45. Each processor 45 has an associated e-cache 50, memory controller 55 and up to eight dual in-line memory modules (DIMMs) 60. Dual CPU data switches (DCDS) 65 are provided for interfacing the processors 45 with the data interconnect 40. Each pair of processors 45 (i.e., two pairs on each processing board 30(1–6)) share a DCDS 65. Also, in the illustrated embodiment, each I/O board 35(1–4) has two I/O controllers 70, each with one associated 66-MHz peripheral component interface (PCI) bus 75 and one 33-MHz PCI bus 80. The I/O boards 35(1–4) may manage I/O cards, such as peripheral component interface cards and optical cards, that are installed in the system 10.

In the illustrated embodiment, the processors 45 may be UltraSPARCIII™ processors also offered by Sun Microsystems, Inc. The processors are symmetric shared-memory multiprocessors implementing the UltraSPARC III protocol. Of course, other processor brands and operating systems 12 may be employed.

Selected modules in the system 10 are designated as field replaceable units (FRUs) and are equipped with FRU identification (FRUID) memories 95. Exemplary FRUs so equipped may include the system controller boards 15(1–2), the processing boards 30(1–6), and the I/O boards 35(1–4). The system 10 may also include other units, such as a power supply 85 (interconnections with other devices not shown), a cooling fan 90, and the like, equipped with FRUIDs 95, depending on the particular embodiment. Various FRUs in the system 10 may include temperature sensors 100 for periodically measuring the temperature environment of the FRU.

Figure 2:
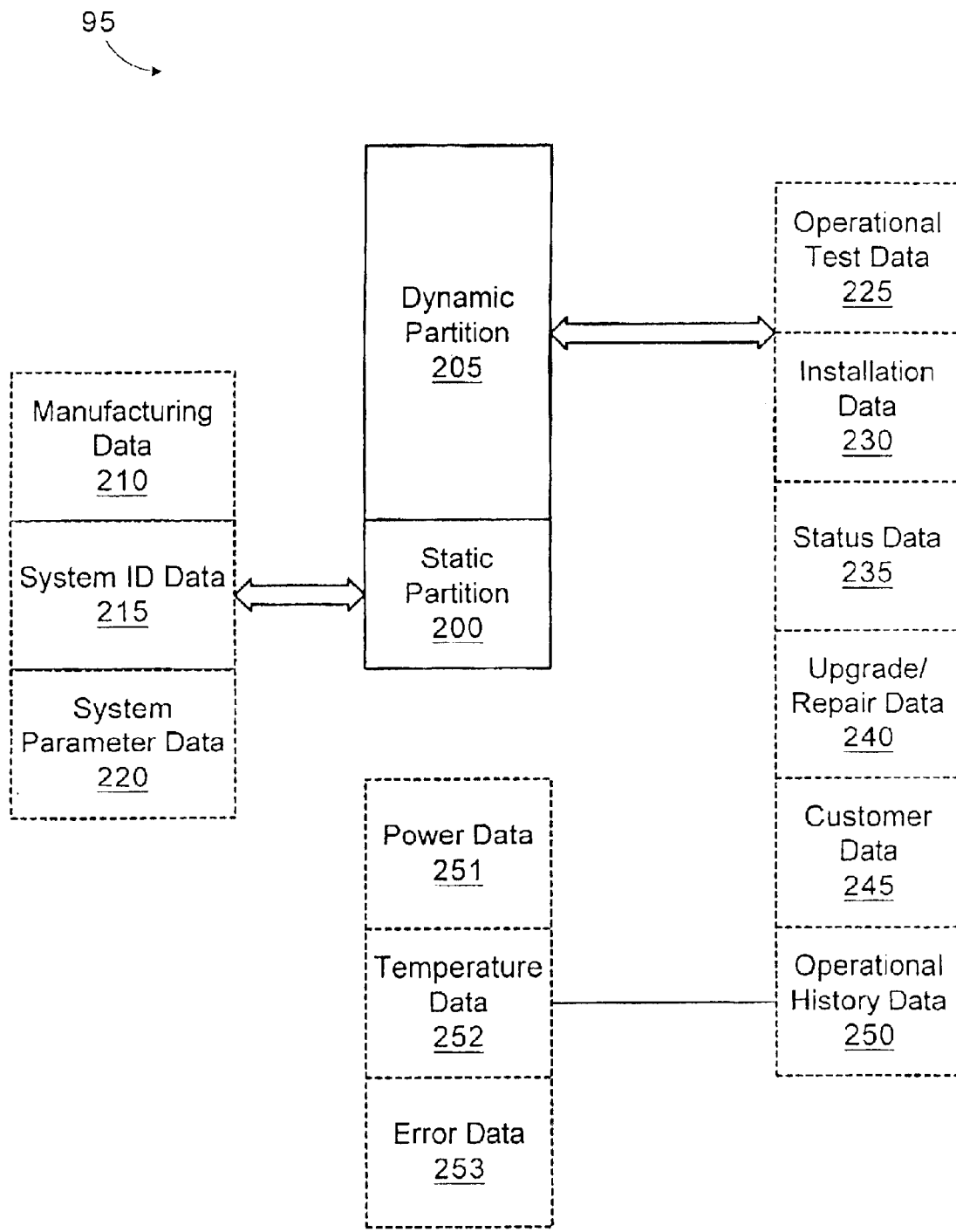
FIG. 2 is a diagram of a field replaceable unit identification (FRUID) memory.

Turning now to FIG. 2, a simplified diagram of the FRUID 95 is provided. In the illustrated embodiment, the FRUID 95 is a serial electrically erasable programmable read-only memory (SEEPROM) and has an 8 Kbyte space to store information about the associated FRU. Of course, other memory types and storage sizes may be used depending on the particular implementation. The FRUID 95 includes a 2 Kbyte static partition 200 dedicated to store "static" information and a 6 Kbyte dynamic partition 205 to store "dynamic" information.

The static information includes:
Manufacturing Data 210;
System ID Data 215; and
System Parameter Data 220.
The dynamic information includes:
Operational Test Data 225;
Installation Data 230;
Status Data 235;
Upgrade Repair Data 240;
Customer Data 245; and
Operational History Data 250;

The particular format for storing data in the FRUID 95 is described in greater detail in U.S. Provisional Patent Application Ser. No. 60/381,400, incorporated above.

Some of the benefits derived from the information stored in the FRUID 95 are:

Fatal Error Identification—a fatal error bit may be set on FRU failure and will remain set until after the FRU has been repaired and reset by the repair depot to prevent "accidental" reuse of the failed FRU;

Ease of Tracking Errors—in the event the FRU has been "repaired" and returned to the field, and failed again subsequently with the same or similar failure, the failure log is tagged to insure special attention will be given to the failed FRU;

Trend Analysis—quick identification of certain batch of FRUs with known defects can be done by a serial number embedded into the SEEPROM;

Trend Analysis—quick analysis can be performed by collecting information of specific FRUs, including power-on hours, temperature logs, and the like;

Trend Analysis—quick identification of components from specific vendors on premature failures of certain FRUs; and Field Change Orders can be applied easily with patches after identifying the range of affected FRU by serial numbers.

Figure 3:
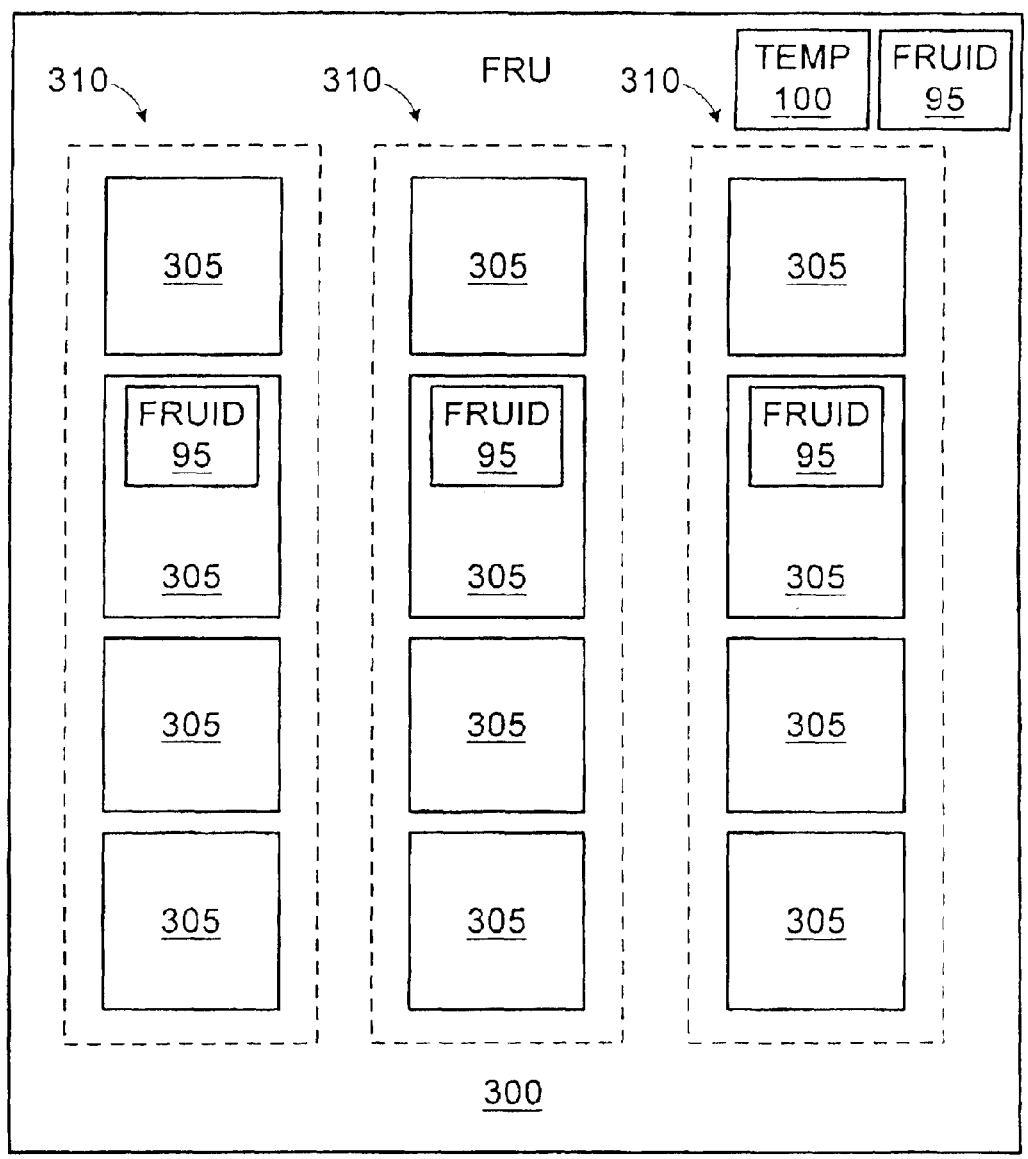
FIG. 3 is a simplified block diagram illustrating a field replaceable unit (FRU) having a plurality of submodules.

Referring now to FIG. 3, a simplified block diagram of an exemplary FRU 300 having a FRUID 95 is shown. As described above, the FRU 300 may represent one of the system control boards 15(1–2), one of the processing boards 30(1–6), one of the input/output (I/O) boards 35(1–4), the power supply 85, the cooling fan 90, and the like. The FRU 300 may be equipped with a temperature sensor 100. The FRU 300 includes a plurality of submodules 305. For example, the FRU 300 may be a processing board 30(1–6), and the submodules 305 may be the processors 45, e-caches 50, memory controllers 55, and DIMMs 60. Selected submodules 305 (e.g., the DIMMS 60) may also be themselves field replaceable and have their own FRUIDs 95. The submodules 305 may be organized into groups 310. For example, a processor 45 and its associated e-cache 50, memory controller 55, and DIMMS 60 may be organized into a single group 310.

Information may be stored in the FRUID 95 by the system controller 20, the operating system software 12, or another software application executed by the system 10. Alternatively, information may be stored in the FRUID 95 by a different computer system or interface (not shown) when the FRU 300 is removed for repair, maintenance, or upgrade Returning to FIG. 2, the data stored in the static partition 200 and dynamic partition 210 is now described in greater detail. The particular types of static and dynamic data stored in the FRUID 95 that are detailed herein are intended to be exemplary and non-exhaustive. Additional static and dynamic data may be stored in the FRUID 95 depending on the particular implementation. The information stored in the static partition 200 is typically information that is not expected to change over the service life of the FRU 300, while the dynamic data includes data that is written to the FRUID 95 during its service life. The dynamic data may be written by the manufacturer, a repair depot, or by the system itself during operation of the FRU 300 at a customer installation.

The manufacturing data 210 may include information such as the part number, serial number, date of manufacture, and vendor name. The system ID data 215 may include information such as an Ethernet address and a system serial number (i.e., of the system in which the FRU is installed). The system parameter data 220 may include information about the system, such as maximum speed, DIMM speed, maximum power, and the like.

The operational test data 225 provides information about the most recent iteration of tests performed on the FRU 300. The operational test data 225 is typically written during the manufacture of the FRU 300 or while it is being repaired, not while the FRU 300 is in the field. When the FRU 300 is received at a repair depot, the operational test data 225 may be accessed to determine which tests had been previously run on the FRU 300. For each of the possible tests that may be run on the FRU 300, a summary record may be provided that indicates when the test was performed and the revision of the testing procedure used.

The installation data 230 specifies where the FRU 300 has been used, including the system identity and details of the parent FRU (i.e., the FRU in which the current FRU 300 is installed). The installation data 230 may also include geographical data (e.g., latitude, longitude, altitude, country, city or postal address) related to the installation.

The status data 235 records the operational status of the FRU 300 as a whole, including whether it should be configured as part of the system or whether maintenance is required. If maintenance is required, a visible indication may be provided to a user by the system. Exemplary status indications include out-of-service (OOS), maintenance action required (MAR), OK, disabled, faulty, or retired. A human-supplied status bit may be used to indicate that the most recent status was set by human intervention, as opposed to automatically by the system. A partial bit may also be used to indicate while the entire FRU 300 is not OOS, some components on the FRU 300 may be out-of-service or disabled. If the system sees the partial bit checked, it checks individual component status bits to determine which components are OOS or disabled. The status data 235 may also include a failing or predicted failing bit indicating a need for maintenance.

The upgrade/repair data 240 includes the upgrade and repair history of the FRU 300. The repair records include repair detail records, a repair summary record, and an engineering change order (ECO) record. Typically, the repair records are updated at a repair depot when a repair is completed on the FRU 300. The repair information stored on the FRUID 95 may also include the number of times a returned FRU 300 is not diagnosed with a problem. During a repair operation, one or more engineering change orders (ECOs) may be performed on the FRU 300 to upgrade its capability (e.g., upgrade a processor 45) or to fix problems or potential problems identified with the particular FRU 300 model. For example, a firmware change may be implemented or a semiconductor chip (e.g., application specific integrated circuit (ASIC)) may be replaced.

The customer data 245 is generally a free-form field in which the customer may choose to store any type of desired information, such as an asset tag, the customer's name, etc. The customer data 245 may be updated at the customer's discretion.

The operational history data 250 includes data related to selected parameters monitored during the service life of the FRU 300. For example, the operational history data 250 may include power data 251, temperature data 252, and/or error data 253.

The power data 251 is useful in reconstructing the usage of the FRU 300. The power event data could indicate whether the FRU 300 was placed in stock or installed in a system and shipped. The idle time would indicate the shelf life at a stocking facility before use. The time interval between a fatal error and a power on at a repair center could be used to track transit time. The total on time could be used to generate a mean time before failure metric or a mean time before fatal error metric.

Figure 4:
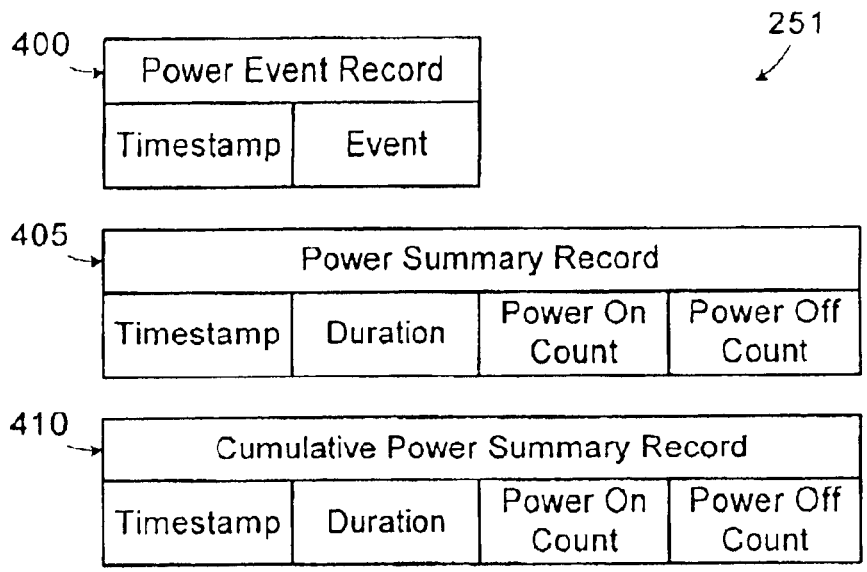
FIG. 4 is a simplified diagram illustrating power data that may be stored in the FRUID memory of FIG. 2.

As shown in FIG. 4, the power data 251 includes power event records 400, a power summary record 405, and a cumulative power summary record 410. The power event records 400 are created when a power on or a power off event occurs. The power on and off event records 400 are stored in a circular buffer arrangement. A "still on" record is also created periodically indicating the FRU 300 is activated. When a "still on" power event record is created it does not advance the circular buffer after each record. Rather, the "still on" record is rewritten in the same location by indexing the circular buffer index after each record is generated. During a controlled power off, the "still on" record is overwritten by the power off event record. In the case of an uncontrolled power off, the last "still on" record remains in the FRUID 95. A subsequent power on record is generated in a new buffer location when the FRU 300 is re-powered. The persistent "still on" record provides an approximation of the actual time of the uncontrolled power off. Power event records 400 include a timestamp field that records the date and time the event occurred, and an event field that specifies the type of event (power on, power off, or still on).

The power summary record 405 is updated during power on events, power off events, and periodically while the FRU 300 is activated. The power summary record 405 tracks part usage and idle time and can be used to calculate mean time before failure values. The power summary record 405 includes a timestamp field, a duration field specifying the total time the FRU 300 has been powered on, a power on count field, and a power off count field.

The cumulative power summary record 410 is updated whenever a FRU 300 is repaired (i.e., at a repair depot). The information in the power summary record 405 associated with the FRU 300 in the previous installation (i.e., prior to failure) is aggregated with previous power summary records 405 from previous installations. Subsequently, the power event records 400 and power summary record 405 are cleared. The cumulative power summary record 410 includes the same fields as the power summary record 405, but its duration is indefinite, unlike the power summary record 405, which is only retained for a particular installation.

The temperature data 252 (see FIG. 2) is useful for analyzing service life and failure rates. Failure rates are often directly dependent on temperature. Various aging mechanisms in the FRU 300 run at temperature controlled rates. Cooling systems are generally designed based on predicted failure rates to provide sufficient cooling to keep actual failure rates at an acceptable level. The temperature data 252 may be used for failed components to determine whether predicted failure rates are accurate. Temperature history can affect failure rate both by aging (i.e., spending time at a high temperature can increase the rate that the FRU 300 will fail at a nominal temperature) and by failure mechanisms unrelated to aging (i.e., spending time at a high temperature can increase the chance of failure at the high temperature without changing the failure rate once the temperature has returned to the nominal temperature).

Figure 5:
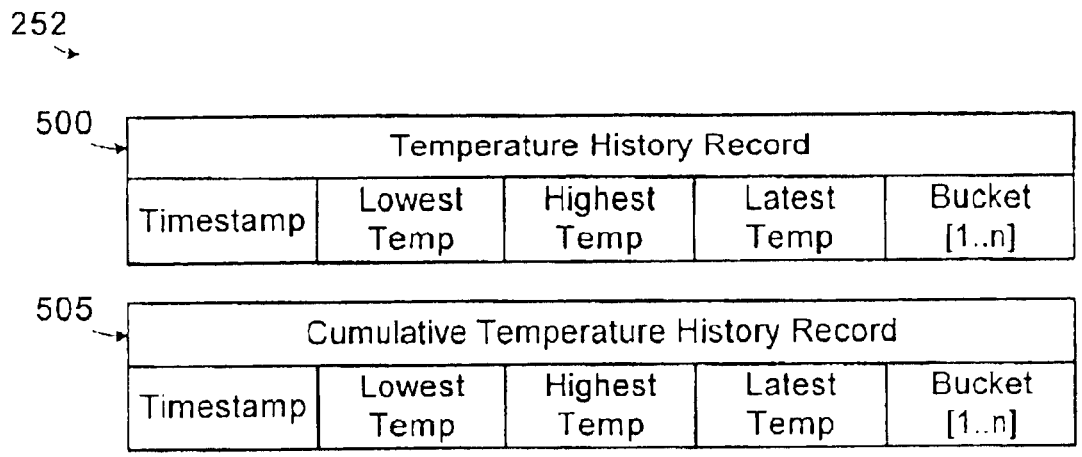
FIG. 5 is a simplified diagram illustrating temperature data that may be stored in the FRUID memory of FIG. 2.

As shown in FIG. 5, the temperature data 252 includes a temperature history record 500 and a cumulative temperature history record 505. The temperature history record 500 stores measured temperature values in a histogram form including a plurality of buckets, each bucket having a predetermined range of temperatures. The count of time in each temperature bucket defines the temperature history of the operating environment. Temperature data from one FRU 300 may be compared to the histories of other like FRUs to establish behavior patterns. Failure histories may be used to proactively replace temperature-sensitive parts.

The temperature history record 500 includes a timestamp field, a lowest temperature field, a highest temperature field, a latest temperature field, and the histogram fields (i.e., array of bucket counts). The lowest and highest operating temperatures are used to establish statistical limits for the operating range of the FRU 300. A latest temperature field may be used to approximate the temperature of the FRU 300 when it failed.

In the illustrated embodiment, each temperature bucket can store data for 64K entries. If temperature is measured every hour, no histogram bucket can overflow before about 8 years. If only one bucket has overflowed, the total hours spent in that bucket may be determined by adding the time in all the other buckets, and subtracting that from the total power on hours of the product. Hence, precise results may be generated for up to at least a 16 year product life with a 16-bit-per-bucket histogram.

Various different histogram records may be defined for different measurement intervals, numbers of buckets, and ranges represented. In the illustrated embodiment, only one histogram is provided for clarity and ease of illustration. The temperature histogram fields are based on a one-hour measurement interval and include eight 10° C.-wide buckets spanning the range of 20° C.–100° C. The end buckets (i.e., high and low) record all values beyond this range. Other variations may be used. In the illustrated embodiment, the temperature measured is the ambient air temperature around the FRU 300. If the FRU 300 has no ambient temperature sensor, the air inlet temperature may be assumed to be the ambient temperature.

The cumulative temperature history record 505 is updated whenever a FRU 300 is repaired (i.e., at a repair depot). The information in the temperature history record 500 associated with the FRU 300 in the previous installation (i.e., prior to failure) is aggregated with previous temperature history records 500 from previous installations. Subsequently, the temperature history record 500 is cleared. The cumulative temperature history record 505 includes the same fields as the temperature history record 500, but its duration is indefinite, unlike the temperature history record 500, which is only retained for a particular installation.

Figure 6:
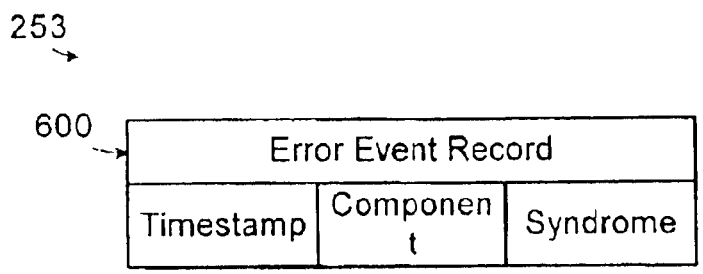
FIG. 6 is a simplified diagram illustrating error data that may be stored in the FRUID memory of FIG. 2.

As shown in FIG. 6, the error data 253 includes error records 600 concerning soft errors from which the system was able to recover. These soft errors include error checking and correction (ECC) errors that may or may not be correctable. A rate-limit algorithm may be used (e.g., by the system controller 20 of FIG. 1) to change the status of the FRU 300 to faulty if more than N errors occur within a FRU-specific time interval, T.

The error record 600 includes a timestamp field, a component field identifying the component in which the error occurred, an error code field that records the specific type of error detected, and a syndrome field that provides more detail about the specific error. Exemplary error code values include correctable ECC error, uncorrectable ECC error, correctable ECC error from e-cache, uncorrectable ECC error from e-cache, correctable ECC error from e-cache for write-back, uncorrectable ECC error from e-cache for write-back, copy-out correctable ECC error, copy out uncorrectable ECC error, software handled correctable e-cache error, software handled uncorrectable e-cache error, correctable tag ECC error, and uncorrectable tag ECC error. The syndrome field records the error state (e.g., single bit error, probable double bit error, probable triple bit error, probable quad bit error, and multiple bit error). The syndrome filed also records the faulty pin number in the case of a memory ECC error or the data bit number in the case of an e-cache error.

Figure 7:
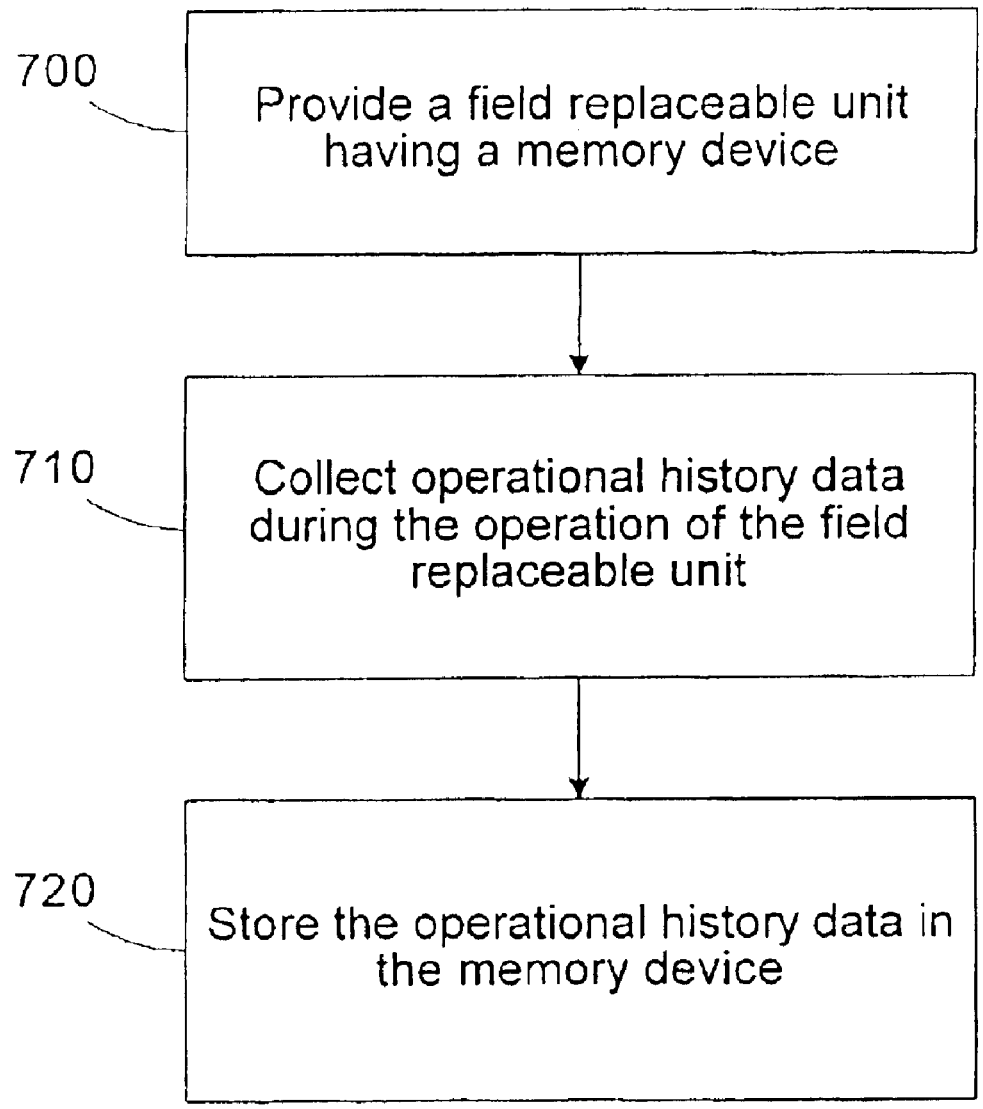
FIG. 7 is a simplified flow diagram of a method for storing operational history data associated with a field replaceable unit in accordance with another embodiment of the present invention.

Turning now to FIG. 7, a simplified flow diagram of a method for storing information for a field replaceable unit in accordance with another embodiment of the present invention is provided. In block 700, a field replaceable unit having a memory device is provided. In block 710, operational history data is collected during operation of the field replaceable unit. The operational history data may include, for example, power data, temperature data, error data, and the like. In block 720, the operational history data is stored in the memory device. The operational history data is useful for constructing the operational environment experienced by the field replaceable unit in its field installation. The operational history data may be accumulated using summary records, and the installation specific operational history data may be cleared after each installation.

Storage of the operational history data on the FRUID 95 provides advantages related to record keeping. The operational history data associated with the service life of the FRU 300 is contained within the FRUID 95, and is thus always available with the device. The operational history data may be used to construct a picture of the operating conditions experienced by the FRU 300. The operational history data may be used for diagnosing problems with the FRU 300 that lead to its failure. For example, the error data 253 may be used to diagnose a problem associated with the FRU 300 that required its immediate repair. The power data 251 and temperature data 252 may be used to diagnose failures related to age or usage. The operational history data may also be used to verify or update failure or aging models associated with the FRU 300.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:
   collecting temperature data during the operation of a field replaceable unit, the temperature data representing a temperature of the field replaceable unit during operation, wherein the temperature data comprises a temperature history that includes a plurality of counts, each of the plurality of counts corresponding to a respective temperature range of a plurality of temperature ranges, wherein the collecting comprises:
      receiving a temperature measurement; and
      incrementing a first count of the plurality of counts, wherein a first temperature range of the plurality of temperature ranges corresponds to the first count, and wherein the first temperature range includes the temperature measurement; and
   storing the temperature data in a memory device of the field replaceable unit.

2. The method of claim 1, wherein receiving the temperature measurement further comprises receiving the temperature measurement at a predetermined interval.

3. The method of claim 1, wherein storing the temperature data further comprises:
aggregating the temperature history with a cumulative temperature history; and
clearing the temperature history.

4. The method of claim 3, wherein the aggregating and the clearing are performed during a repair of the field replaceable unit.

5. The method of claim 1, wherein the temperature data comprises a highest detected temperature and a lowest detected temperature.

6. The method of claim 1 further comprising:
collecting additional operational history data during operation of the field replaceable unit; and
storing the operational history data in the memory device.

7. The method of claim 6, wherein the operational history data comprises power data.

8. The method of claim 7, wherein the power data comprises a plurality of power event records.

9. The method of claim 8, wherein the plurality of power event records comprise power event records associated with at least one of a power on event, a power off event, and a still on event.

10. The method of claim 7, wherein the power data further comprises a power summary record.

11. The method of claim 10, wherein the power summary record comprises a duration field specifying the total time the field replaceable unit has been powered on.

12. The method of claim 10, wherein the power summary record further comprises at least one of a power on count and a power off count.

13. The method of claim 10, further comprising:
aggregating the power summary record with a cumulative power summary record; and
clearing the power summary record.

14. The method of claim 13, further comprising aggregating the power summary record and clearing the power summary record associated with a repair of the field replaceable unit.

15. The method of claim 6, wherein the operational history data further comprises error data associated with the operation of the field replaceable unit.

16. The method of claim 15, wherein the error data further comprises a plurality of error event records.

17. The method of claim 16, wherein at least one of the plurality of error event records comprises a component field and an error code.

18. The method of claim 17, wherein at least one of the plurality of error event records further comprises a syndrome field associated with the number of errant bits associated with the error event record.

19. The method of claim 17, wherein at least one of the plurality of error event records further comprises storing a syndrome field indicating at least one of a faulty pin number and a faulty data bit number associated with the error event record.

20. A computing system comprising:
a field replaceable unit including a memory device configured to store temperature data indicative of a temperature of the field replaceable units, wherein the temperature data comprises a temperature history that includes a plurality of counts, each of the plurality of counts corresponding to a respective temperature range of a plurality of temperature ranges; and
a processing device configured to collect the temperature data and store the temperature data in the memory device, wherein the processing device, in response to receiving a temperature measurement, is configured to increment a first count of the plurality of counts, wherein a first temperature range of the plurality of temperature ranges corresponds to the first count, and wherein the first temperature range includes the temperature measurement.

21. The system of claim 20, wherein the system further comprises at least one temperature sensor associated with the field replaceable unit, and the processing device is configured to receive temperature measurements from the temperature sensor.

22. The system of claim 20, wherein the temperature data further comprises a cumulative temperature history including an aggregation of a plurality of temperature histories.

23. The system of claim 20, wherein the temperature data further includes a highest detected temperature and a lowest detected temperature.

24. The system of claim 20, wherein the processing device is further configured to collect additional operational history data and store the operational history data in the memory device.

25. The system of claim 24, wherein the operational history data further comprises power data.

26. The system of claim 25, wherein the power data further comprises a plurality of power event records.

27. The system of claim 26, wherein each power event record is associated with at least one of a power on event, a power off event, and a still on event.

28. The system of claim 25, wherein the power data further comprises a power summary record.

29. The system of claim 28, wherein the power summary record further comprises a duration field specifying the total time the field replaceable unit has been powered on.

30. The system of claim 28, wherein the power summary record further comprises at least one of a power on count and a power off count.

31. The system of claim 28, wherein the power data further comprises a cumulative power summary record including an aggregation of a plurality of power summary records.

32. The system of claim 24, wherein the operational history data further comprises error data associated with the operation of the field replaceable unit.

33. The system of claim 24, wherein the operational history data further comprises error data associated with the operation of the field replaceable unit, and the processing device is configured to receive error data and store the error data in the memory device.

34. The system of claim 33, wherein the error data further comprises a plurality of error event records.

35. The system of claim 34, wherein each of the error event records further comprises a component field and an error code.

36. The system of claim 34, wherein each of the error event records further comprises a syndrome field associated with the number of errant bits.

37. The system of claim 34, wherein each of the error event records further comprises a syndrome field indicating at least one of a faulty pin number and a faulty data bit number.

38. A method comprising:
collecting a plurality of power event records during the operation of a field replaceable unit, wherein at least one of the plurality of power event records indicates a still on event, and wherein the still on event includes an indication of a time at which the still on event was recorded, and wherein the still on event is indicative that the field replaceable unit was in a powered on state at the time at which the still on event was recorded; and storing the plurality of power event records in a memory device of the field replaceable unit.

39. The method as recited in claim 38, wherein the plurality of power event records further comprise a power on record indicative of a powering on of the field replaceable unit.

40. The method as recited in claim 39, wherein the plurality of power event records further comprise a power off record indicative of a powering off of the field replaceable unit.

41. The method as recited in claim 38, further comprising storing a power summary record in the memory device.

42. The method as recited in claim 41, wherein the power summary record comprises a duration field specifying the total time the field replaceable unit has been powered on.

43. The method as recited in claim 41, wherein the power summary record further comprises at least one of a power on count and a power off count.

44. The method as recited in claim 41, further comprising:

aggregating the power summary record with a cumulative power summary record; and clearing the power summary record.

45. The method as recited in claim 44, wherein the aggregating is associated with a repair of the field replaceable unit.

46. A system comprising:

a field replaceable unit including a memory device configured to store a plurality of power event records, wherein at least one of the plurality of power event records indicates a still on event, and wherein the still on event includes an indication of a time at which the still on event was recorded, and wherein the still on event is indicative that the field replaceable unit was in a powered on state at the time at which the still on event was recorded; and a processing device configured to collect the plurality of power event records and store the plurality of power event records in the memory device.

47. The system as recited in claim 46, wherein the plurality of power event records further comprise a power on record indicative of a powering on of the field replaceable unit.

48. The system as recited in claim 47, wherein the plurality of power event records further comprise a power off record indicative of a powering off of the field replaceable unit.

49. The system as recited in claim 46, wherein the processing device is further configured to store a power summary record in the memory device.

50. The system as recited in claim 49, wherein the power summary record comprises a duration field specifying the total time the field replaceable unit has been powered on.

51. The system as recited in claim 49, wherein the power summary record further comprises at least one of a power on count and a power off count.

52. The system as recited in claim 49, wherein the memory device further stores a cumulative power summary record during use, and wherein the power summary record is aggregated into the cumulative power summary record and cleared.

53. The system as recited in claim 52, wherein the aggregating is associated with a repair of the field replaceable unit.

* * * * *